United States Patent [19]

Barnett et al.

[11] Patent Number: 4,927,654

[45] Date of Patent: May 22, 1990

[54] WATER SOLUBLE BULKING AGENTS

[75] Inventors: Ronald E. Barnett, Brewster, N.Y.; Roxane Dikeman, Arlington Heights, Ill.; Shyh-Yuan Liao, Schaumburg, Ill.; John Gill, Mount Prospect, Ill.; David P. Pantaleone, Buffalo Grove, Ill.

[73] Assignee: The Nutrasweet Company, Deerfield, Ill.

[21] Appl. No.: 218,532

[22] Filed: Jul. 15, 1988

Related U.S. Application Data

[63] Continuation-in-part of Ser. No. 76,632, Jul. 23, 1987, abandoned, which is a continuation-in-part of Ser. No. 19,816, Feb. 27, 1987, abandoned.

[51] Int. Cl.$^5$ .............................................. A23L 1/308
[52] U.S. Cl. .................................... 426/548; 426/565; 426/566; 426/567; 426/658; 426/804; 426/660; 426/573
[58] Field of Search ............... 426/573, 658, 548, 804, 426/660, 565, 566, 567

[56] References Cited

U.S. PATENT DOCUMENTS

| | | | |
|---|---|---|---|
| 3,737,322 | 6/1973 | Frey | 426/804 |
| 3,738,843 | 6/1973 | Frey | 426/573 |
| 3,767,423 | 10/1973 | Tsantir | 426/804 |
| 3,947,604 | 3/1976 | McGinley et al. | 426/573 |
| 4,042,720 | 8/1977 | Farkner | 426/573 |
| 4,526,794 | 7/1985 | Altomare et al. | 426/658 |
| 4,565,702 | 1/1986 | Morley | 426/804 |
| 4,645,541 | 2/1987 | DeLong | 426/658 |
| 4,698,232 | 10/1987 | Sheu et al. | 426/804 |
| 4,714,620 | 12/1987 | Bunick et al. | 426/804 |

*Primary Examiner*—Jeanette Hunter
*Attorney, Agent, or Firm*—Jeffrey M. Hoster

[57] ABSTRACT

A modified hemicellulose A, hemicellulose B, modified hemicellulose A, modified hemicellulose B, or mixtures thereof are employed as water soluble bulking agents to replace the functional properties of carbohydrates or fats.

17 Claims, No Drawings

WATER SOLUBLE BULKING AGENTS

This patent application is a continuation-in-part (CIP) of Ser. No. 076,632 filed on July 23, 1987, which was a CIP of Ser. No. 019,816 filed on Feb. 27, 1987, which are incorporated herein by reference.

BACKGROUND OF THE INVENTION

The present invention relates to water soluble bulking agents useful to maintain volume and functional properties in food formulations when the usual fat and/or carbohydrate constituents are removed or replaced. Such fat and/or carbohydrate constituents include vegetable oils or dairy fats and sucrose. In particular, hemicellulose fractions such as hemicellulose A or hemicellulose B, as well as modifications and combinations of the preceding, are employed to replace part or all of the bulk of carbohydrates and fats in foods where the carbohydrate and fat content has been reduced or eliminated. agents.

The lack of an adequate bulking agent for fat or carbohydrate replacement is a serious problem encountered in the food industry. When high potency sweeteners are used as replacements for sucrose, this is a particularly serious problem in formulations such as confections, ice cream, frozen novelties, and baked goods, etc., which depend greatly on the "non-sweet" functional properties of sucrose. These so-called "non-sweet" properties of sucrose include flavor enhancement, freezing point depression, bulkability, boiling point elevation, glass formation, moisture retention, texture maintenance, increased viscosity, hydration control, and caramelization. Without these functional properties, it is difficult to simulate conventional food formulations because high potency sweeteners generally have the sweetness of sugar but usually not these other "non-sweet" functional properties. In addition to the above difficulties, some sugar bulking agents currently in use such as polydextrose, sorbitol, and maltitol cause osmotic diarrhea.

Fats also have functional properties which must be simulated if the fat is acceptably replaced by a bulking agent or fat substitute. These properties include texture improvement, dispersion of non-water soluble ingredients, increased viscosity, lubrication, air incorporation, bulkability, and preservation of freshness.

The present invention provides water soluble bulking agents which replace many of the functional characteristics of carbohydrates and fats when used in food formulations.

Summary of Invention

Hemicellulose B or hemicellulose A, as well as modifications and mixtures thereof (hereinafter referred to as "the present bulking agents") are employed as water soluble bulking agents. The bulking agent may replace all or part of a fat or carbohydrate. High potency sweeteners, such as aspartame, trichlorogalactosucrose (TGS), alitame, saccharin, acesulfame-K, cyclamates, steveoside or mixtures thereof can be mixed with the present bulking agents to replace sucrose and provide a sweetener composition having the sweetness and also the non-sweet functional properties of sucrose.

The present bulking agents may also be used to replace the other carbohydrates and fats. The bulking agents provide functional properties of carbohydrates and fats.

DETAILED DESCRIPTION OF THE INVENTION

Hemicellulose is a structural component of plant materials which is ubiquitous in nature. The term "hemicellulose" refers not to one chemical entity but to a large family of molecules. While these molecules may vary in specific properties such as molecular weight, solubility, and monomer composition, they have in common a variety of characteristics as well as their function in nature. They are all polysaccharides which are polymers of individual carbohydrate units. Many of these carbohydrate units are pentoses such as xylose and arabinose. Because hemicellulose is a family of molecules which differ in specific properties, the isolation of hemicellulose from nature results in the separation of various fractions as a function of the isolation procedure. The fractions of interest to this invention are called "hemicellulose A" and "hemicellulose B".

When used herein, the term "hemicellulose A" refers to a fraction of hemicellulose that precipitates when an alkaline extraction mixture isolated from plant material is then acidified.

Hemicellulose A is obtained employing procedures described in the literature and in particular in Methods of Carbohydrate Chemistry, Vol. V, General Polysaccharides, (1965), Academic Press, pp. 144–145, which is incorporated herein by reference.

When used herein, the term "hemicellulose B" refers to the hemicellulose fraction which precipitates when ethanol is added to an acidified hemicellulose mixture (following hemicellulose A removal) isolated from plant material by extraction with alkaline solutions.

When used herein, the term "modified hemicellulose" refers to the alteration of native hemicellulose by chemical methods such as acid treatment or by enzymatic hydrolysis. The modification results in the breakdown of the polysaccharide polymer to components of lower molecular weight some of which may be as small as oligosaccharides which are composed of only 4–10 sugar monomer units.

When used herein, the term "water soluble bulking agent" refers to a material which preferentially forms water soluble solutions or interacts freely and strongly with water while able to substitute for fats and carbohydrates in food formulations. These water soluble bulking agents possess functional properties of carbohydrates and fats, including the non-sweet functional properties of sweet carbohydrates, such as sucrose. These properties include an increase in starch gelatinization temperature, freezing point depression, and suitable mouthfeel or texture.

Hemicellulose as it occurs in nature is intertwined with other structural components such as cellulose and lignin. Lignin is often called the "glue" which holds the structural components together. Therefore, the isolation of hemicellulose must be accompanied by the removal of lignin in a process called delignification.

Hemicellulose isolation and delignification can be accomplished by a variety of methods well documented in prior art. Most often used is an alkaline treatment of the plant material but some hemicelluloses may be removed from sources having low lignin content by water treatment alone.

When used herein, the term "partially delignified plant fibers" refers to any plant fibers which have been partially delignified. Usually, from about 30 to 70 and preferably about 40 to 60 percent of the lignin should be removed from the plant fiber substrate to facilitate hemicellulose isolation. Preferably, the partially delignified plant fibers are alkaline peroxide-treated conversion products of lignocelluloseic substrates although simple aqueous or alkaline treatment of such substrates may be sufficient. Partially delignified plant fibers are a source for hemicellulose.

Alkaline peroxide treatments of nonwoody lignocellulosics are disclosed in the following U.S. patents or patent applications: U.S. Pat. No. 4,649,115; Ser. No. 06/809,80filed 12/16/85 and now abandoned; and Ser. No. 06/912,296 filed 9/29/86 now U.S. Pat. No. 4,806,475, all of which are incorporated herein by reference. Additionally, all of the specifications of the prior referenced patent applications are available from National Technical Information Service, 5285 Port Royal Rd., Springfield, Va. 22161.

The partially delignified plant fibers and hemicellulose fractions defined above are obtained from any lignocellulosic substrate but preferably nonwoody lignocellulosic substrates. Suitable substrates include corn bran, corn stover, corn cobs, wheat bran, sugar cane bagasse, alfalfa hay, barley bran, barley hulls, oat bran, oat hulls, kenaf, western larch heartwood chips, rice bran, sugar beet pulp, citrus pulp, citrus peel, peanut shells, banana peels, okra stover, soy bean stover, and esparto grass.

In practicing the present invention relating to water soluble bulking agents, hemicellulose fractions such as hemicellulose A or B, as well as modifications and mixtures thereof, are added to food products to replace all or a portion of a carbohydrate or fat. The bulking agent will surprisingly impart to the food products functional properties of the replaced carbohydrate or fat. For example, all or a portion of the sweet carbohydrate can be substituted by the present bulking agent to replace non-sweet functional properties.

The present water soluble bulking agents are substituted for the carbohydrate or fat in an amount ranging from a replacement ratio by weight of about 0.1 to about 3 of bulking agent to the carbohydrate or fat originally present in the food product. The optimum replacement ratio will depend on a variety of factors, such as, for example, the particular bulking agent employed, the particular carbohydrate or fat being replaced, the particular food product formulation, food processing conditions and the like. The optimum replacement ratio can be readily determined by one skilled in the art by conducting routine food formulation experiments. Preferably, the carbohydrate or fat is totally removed from the food formulation any of the hemicellulose compositions described hereinbefore are useful as water soluble bulking agents.

Modification of hemicellulose is achieved when hemicellulosic A or B fractions obtained from any plant source are subjected to acid or enzymatic hydrolysis which result in the breakdown of the polysaccharide such that a reduction of molecular weight is observed. If desired, resulting products may be minimized in size to oligosaccharides composed of only 4 to 10 sugar units. Acid hydrolysis can be achieved by reacting hemicellulose A with an acid such as 2 Molar sulfuric acid, 5N HCl or 10% (w/w) trifluoroacetic acid for a time sufficient to degrade the hemicellulose to the desired degree. Enzymatic hydrolysis is achieved by contacting hemicellulose A with a suitable enzyme such as a xylanase or cellulase, for a time sufficient to degrade the hemicellulose to the desired degree.

Preferred hemicellulose water soluble bulking agents are hemicelluloses extracted from substrates conventionally used in food products. Such substrates include, but are not limited to wheat bran, corn bran, barley bran, barley hulls, oat bran, and oat hulls.

In one application, the present water soluble bulking agents are employed to replace all or part of sucrose in a food product. The water soluble bulking agents are substituted for sucrose in formulating the food product. While the order of addition or timing of addition of the food ingredients is not critical to the practice of the present invention, it is convenient to merely substitute the present water soluble bulking agents for sucrose in the food manufacturing process. For every one part by weight of sucrose removed from the food product about 0.1 to about 1.0, and preferably about 0.5 to about 1.0, by weight (dry) of the present bulking agents are added to replace the sucrose.

Optionally, the present water soluble bulking agents can be premixed with a high potency sweetener to provide a sweetener composition which contains the sweetness of the high potency sweetener with the nonsweet properties of the water soluble bulking agent resulting in a product that is a total sugar replacement. The ratio of water soluble bulking agent to high potency sweetener is not critical. The present invention includes concentrated compositions containing high levels of sweetener or dilute compositions containing low levels of high potency sweetener.

Suitable high potency sweeteners include aspartame (and salts and metal complexes thereof), including aspartame encapsulated by fats or other substances, alitame, trichlorogalactosucrose (TGS), saccharin, cyclamates, neohesperidine dihydrochalcone, stevioside, glycyrrhizin, acesulfame-K, monellin and thaumatin. Preferred high potency sweeteners include aspartame, TGS, acesulfame-K, saccharin, cyclamates and mixtures thereof.

The high potency sweetener and/or soluble bulking agents can be dry mixed or dissolved in water and thereafter dried by standard drying techniques such as spray drying, freeze drying, and the like.

In a preferred embodiment of the present invention, aspartame is admixed with hemicellulose B as a water soluble bulking agent in the following weight range:

| | |
|---|---|
| aspartame | 0.01–10 weight percent |
| hemicellulose B | 90–99.99 weight percent |

Preferably, the hemicellulose B is derived from a wheat bran, corn bran, barley bran, barley hulls, oat bran, or oat hulls.

The present water soluble bulking agents are particularly useful in food products such as confections and baked goods where sucrose provides not only sweetness, but also other functional properties described hereinbefore. Particularly preferred food products containing the present water soluble bulking agents include soft drinks, breads, cakes, pastries, candies, and frozen confections such as ice cream, frozen novelties, fruit bars, pudding pops, ice cream cakes, ice cream sandwiches, ice cream bars and the like. Fats and carbohydrates other than sucrose may also be replaced by the water soluble bulking agents.

In a typical ice cream formulation, the present water soluble bulking agents will replace from about 1 to about 100 weight percent of sucrose normally present in such ice cream formulation. In a hard candy formulation, the present water soluble bulking agents will usually replace from about 1 to about 100 weight percent of sucrose normally present in such candy. In baked goods such as cakes, pastries, breads and the like, the present water soluble bulking agents will usually be present in amounts of from about 1 to about 100 percent by weight of sucrose normally present in the baked goods.

While the preferred practice of the present invention relates to replacing sugar with the water soluble bulking agent and a high potency sweetener, the present invention also contemplates substituting only a portion of sugar with the present water soluble bulking agents. In some food products, such as frostings and icings, sucrose is present in amounts above the amount necessary to impart an acceptable sweet taste. In these food products, the excess sugar needed for nonsweet functions can be replaced by the present water soluble bulking agents without the use of a high potency sweetener.

In another application, the present bulking agents are employed to replace all or part of fat in a food product. As food products such as ice cream may have up to 18% by weight fat, the amount of the bulking agent may be up to 18% by weight if a 1:1 ratio is desired. Other types of frozen confections may also include similar amounts of fat. In most cases, however, the functional properties of fat are achieved using much lower quantities of bulking agent. Fats may be replaced in a weight ratio range from 1:20 to 2:1 bulking agent to fat content of a formulation. If it is desired, both sucrose and fat may be totally replaced by the bulking agent, the amount of which may be up to 25% of the frozen confection formulation by weight. In such replacements, the bulking agent is typically not added on a 1:1 equivalence of the sucrose and fat as it will be available for both fat and sucrose functionality.

The following examples illustrate the practice of the present invention but should not be construed as limiting its scope.

EXAMPLE 1

Hemicellulose B as a Water Soluble Bulking Agent to Replace Sucrose

Hemicellulose B is extracted from partially delignified wheat bran in a 16 hour aqueous extraction process at room temperature employing 1N NaOH. Following extraction, the supernatant is adjusted to pH 4.5 with acetic acid. Hemicellulose A precipitates out of the supernatant and is removed by filtration or centrifugation. Ethanol/water is added to the supernatant to precipitate the hemicellulose B.

The hemicellulose B is admixed with aspartame in a weight ratio from about 75:1 to about 200:1, respectively, to form a sweetener composition having the sweetness and non-sweet functional properties of sucrose. This sweetener composition is used to replace sucrose in ice cream, candies and baked goods. Alternatively, the hemicellulose B is used alone to replace the bulk of sugar in reduced or no-sugar food products.

EXAMPLE 2

Modified Hemicellulose A as a Water Soluble Bulking Agent to Replace Sucrose

Hemicellulose A, which precipates from the supernatant at acid pH in Example 1, is recovered. The hemicellulose A is hydrolyzed by treatment in 1N HCl at 60° C. for 4 hours to form modified hemicellulose. This modified hemicellulose A is admixed with aspartame in a weight ratio ranging from about 75:1 to about 200:1, respectively, to form a sweetener composition having the sweetness and non-sweet functional properties of sucrose. This sweetener composition is used to replace sucrose in ice cream, candies, and baked goods. Alternatively, the modified hemicellulose A can be used alone to replace the bulk of sugar in reduced or no-sugar food products.

EXAMPLE 3

Hemicellulose B as a Water Soluble Bulking Agent to Replace Fat and Sucrose in Ice Cream-Type Frozen Dessert Raw wheat bran is washed three times with water to remove contaminating starch. The washed wheat bran is then washed with 0.2N HCl for 1 hour to remove additional starch, phytic acid, and metal contaminants. The acid treated, washed bran is then extracted with 1N NaOH for 16 hours at room temperature to remove hemicellulose. The pH was adjusted to 4.5 with 1N HCl to Precipitate and remove hemicellulose A. Ethanol (2 volumes) was added to precipitate and isolate hemicellulose B. After dewatering with additional alcohol, the resulting hemicellulose B was dried and milled for use in the formulation below.

The following ingredients were mixed in the weight proportions indicated below and frozen in an ice cream machine using 50% overrun:

12.0% Non-Fat Milk Solids (Skim milk plus dry milk solids)
1.0% Butter Fat (Cream)
3.0% Hemicellulose B
0.1% aspartame (NutraSweet ® Brand)
0.3% vanilla flavoring
83.6% water The above showed excellent sensory and stability characteristics when compared to a control containing 12% butter fat and 15% sucrose. Hemicellulose imparts a rich, creamy mouthfeel in the absence of most of the butter fat found in normal ice cream.

EXAMPLE 4

Modified Hemicellulose B as a Water Soluble Bulking Agent to Replace Fat and Sucrose in an Ice Cream-Type Frozen Confection Hemicellulose B is isolated from wheat bran by the procedure described above in Example 3 with the exception that following a pH adjustment in the range 5.0–6.5 following NaOH extraction, a commercial enzyme preparation containing hemicellulase and cellulase activity (Pectinex 3XL ®) is added to effect hydrolysis of hemicellulose and molecular weight reduction.

The frozen dessert is prepared as described above except that 5.0% modified hemicellulose B and 81.6% water are used. The resulting dessert has sensory and stability characteristics similar to controls, but has a slightly "lighter" mouthfeel when compared to the formulation in Example 3.

EXAMPLE 5

Hemicellulose (A plus B) as a Water Soluble Bulking Agent to Replace Sugar in a Fruit Ice-Type Frozen Dessert Hemicellulose is isolated from wheat barn by the procedure described above in Example 3 with the exception that the pH is adjusted to 7.5 prior to alcohol addition such that most of the hemicellulose A is retained as well as hemicellulose B.

The hemicellulose thus obtained was used in the preparation of the following sugar-free fruit ice-type frozen dessert:

| Orange Juice | 800.0 ml |
| --- | --- |
| Hemicellulose | 32.0 grams |
| Aspartame (NutraSweet ® Brand) | 0.6 grams |

The resulting frozen dessert has a light, creamy texture without icy mouthfeel.

EXAMPLE 6:

Hemicellulose B as a Water Soluble Bulking Agent to Replace Fat in a Butter-Vanilla Cookie Formulation Hemicellulose B is isolated from corn bran following treatment with amylase (Thermolase®) to remove contaminating starch. The destarched corn bran is extracted in 1N NaOH as described above with subsequent isolation in 4 volumes of ethanol. The corn bran hemicellulose is dewatered in ethanol, dried, milled, and incorporated in the cookie formulation as shown below:

| Ingredients | Amount |
| --- | --- |
| Pastry Flour | 50.0 grams |
| Bread Flour | 17.5 grams |
| Polydextrose | 39.0 grams |
| Maltrin M-180 | 21.5 grams |
| Sorbitol | 3.8 grams |
| Whey Protein Concentrate | 6.5 grams |
| Monoglyceride Alphadim | 1.5 grams |
| Baking Soda | 0.6 grams |
| Baking Powder | 0.2 grams |
| Salt | 1.8 grams |
| Aspartame (NutraSweet ® Brand) | 3.5 grams |
| Whole Egg | 17.5 grams |
| Water | 55.0 ml |
| Artificial Butter-Vanilla Flavor | 2.5 grams |
| Imitation Butter Flavor | 2.5 ml |
| Corn Bran Hemicellulose | 23.6 grams |

The above ingredients are mixed thoroughly and baked in an oven at 325 degrees F. for 20 minutes. The resulting cookies are a pleasing golden brown color, moist, and chewy. In the presence of hemicellulose but without added oil or solid fat, the above formulation gave nicely shaped, well-spread cookies. A conventional cookie recipe includes 25.0 grams of fat instead of the hemicellulose.

I claim:

1. A sweetener composition comprising:
    (a) a high potency sweetener and
    (b) a water soluble bulking agent selected from the group consisting of:
    (i) a hemicellulose A
    (ii) a hemicellulose B
    (iii) a modified hemicellulose A
    (iv) a modified hemicellulose B and
    (v) mixtures of (i), (ii), (iii), and (iv).
2. The composition of claim 1 wherein the high potency sweetener is aspartame or its salts or metal complexes, alitame, TGS, saccharin, cyclamates, acesulfam-K or mixtures thereof.
3. The composition of claim 2 wherein the high potency sweetener is aspartame or its salts or metal complexes.
4. The composition of claim 3 wherein the high potency sweetener is aspartame.
5. The composition of claim 4 wherein the water soluble bulking agent is a hemicellulose B.
6. The composition of claim 1 wherein the water bulking agent is a hemicellulose B.
7. In a method of producing a food product having a carbohydrate, the improvement which comprises:
    replacing all or a portion of said carbohydrate with a water soluble bulking agent in an amount of from about 10% to about 100% by weight the amount of said carbohydrate, said bulking agent selected from the group consisting of a hemicellulose A, a modified hemicellulose A, a modified hemicellulose B, or mixtures thereof bulking agent is sufficient to replace the functional properties of said carbohydrate.
8. The method of claim 7 wherein said carbohydrate is sucrose.
9. The method of claim 8 wherein said food product is a frozen confection product.
10. The method of claim 9 wherein said water soluble bulking agent is a hemicellulose B.
11. The method of claim 10 wherein said hemicellulose B is derived from wheat bran, corn bran, barley bran, barley hulls, oat bran, or oat hulls.
12. In a frozen connection product containing fat and sucrose, the improvement which comprises:
    replacing all or a portion of fat and sucrose with a water soluble bulking agent comprising hemicellulose A, hemicellulose B, modified hemicellulose A, modified hemicellulose B, or mixtures thereof, wherein the bulking agent is present in an amount sufficient to replace the functional properties of said fat and sucrose.
13. The frozen confection product of claim 12 wherein said bulking agent replaces from 0 to 18% butter fat and from 0 to 25% sucrose with the combined amount of butter fat and sucrose being at least 0.2%.
14. In a method of producing a food product having a fat, the improvement which comprises:
    replacing all or a portion of said fat with a water soluble bulking agent in an amount of from about 5% to about 200% by weight the amount of said fat, said bulking agent selected from the group consisting of a hemicellulose A, a hemicellulose B, a modified hemicellulose A, a modified hemicellulose B, or mixtures thereof wherein said bulking agent is sufficient to replace the functional properties of said fat.
15. The method of claim 14 wherein said product is a frozen confection product.
16. The method of claim 14 wherein said water soluble bulking agent is a hemicellulose B.
17. The method of claim 16 wherein said hemicellulose B is derived from wheat bran, corn bran, barley bran, barley hulls, oat bran, or oat hulls.

* * * * *